United States Patent

[11] 3,623,660

| [72] | Inventors | Angelo Manlio Vavassori;<br>Enrico Pozzi, both of Milan, Italy |
|---|---|---|
| [21] | Appl. No. | 884,567 |
| [22] | Filed | Dec. 12, 1969 |
| [45] | Patented | Nov. 30, 1971 |
| [73] | Assignee | ELICOPTER Società Trasporti Aerei S.p.A.<br>Milan, Italy |
| [32] | Priority | Mar. 27, 1969 |
| [33] | | Italy |
| [31] | | 14692A/69 |

[54] DRIPPROOF VALVE FOR PREVENTING THE LEAKAGE OF LIQUID PRODUCTS
1 Claim, 2 Drawing Figs.

[52] U.S. Cl. .................................................. 239/114,
137/525.1, 239/464, 239/494
[51] Int. Cl. ...................................................... B05b 15/02
[50] Field of Search ............................................ 239/464,
104, 114–118, 463, 464, 488, 491, 494, 519, 534,
535, 602; 137/525, 525.1

[56] References Cited
UNITED STATES PATENTS

| 848,995 | 4/1907 | Hull | 239/488 |
|---|---|---|---|
| 1,756,483 | 4/1930 | Estep | 239/494 |
| 2,304,456 | 12/1942 | Hall | 239/118 X |
| 2,642,259 | 6/1953 | Catlin | 137/525.1 |
| 3,223,331 | 12/1965 | Baker | 239/464 |
| 2,052,560 | 9/1936 | French | 239/535 |

Primary Examiner—M. Henson Wood, Jr.
Assistant Examiner—Michael Y. Mar
Attorney—Stevens, Davis, Miller & Mosher ABSTRACT: Dripproof valve for preventing the leakage of liquids, consisting of a diaphragm or membrane provided with at least one opening or hole having an elastically deformable lip or border, slidingly coupled with a pin passing through said opening or hole. The membrane is made of an elastic material such as rubber, an elastomeric synthetic material or the like. The lipped opening consists of a circular hole disposed in the middle of the membrane. Coupled with the membrane is a disc of rigid material, provided with an opening corresponding to the opening in the membrane. The valve is applied to a nozzle for the spraying of liquids, being particularly suited for soil or crop spraying.

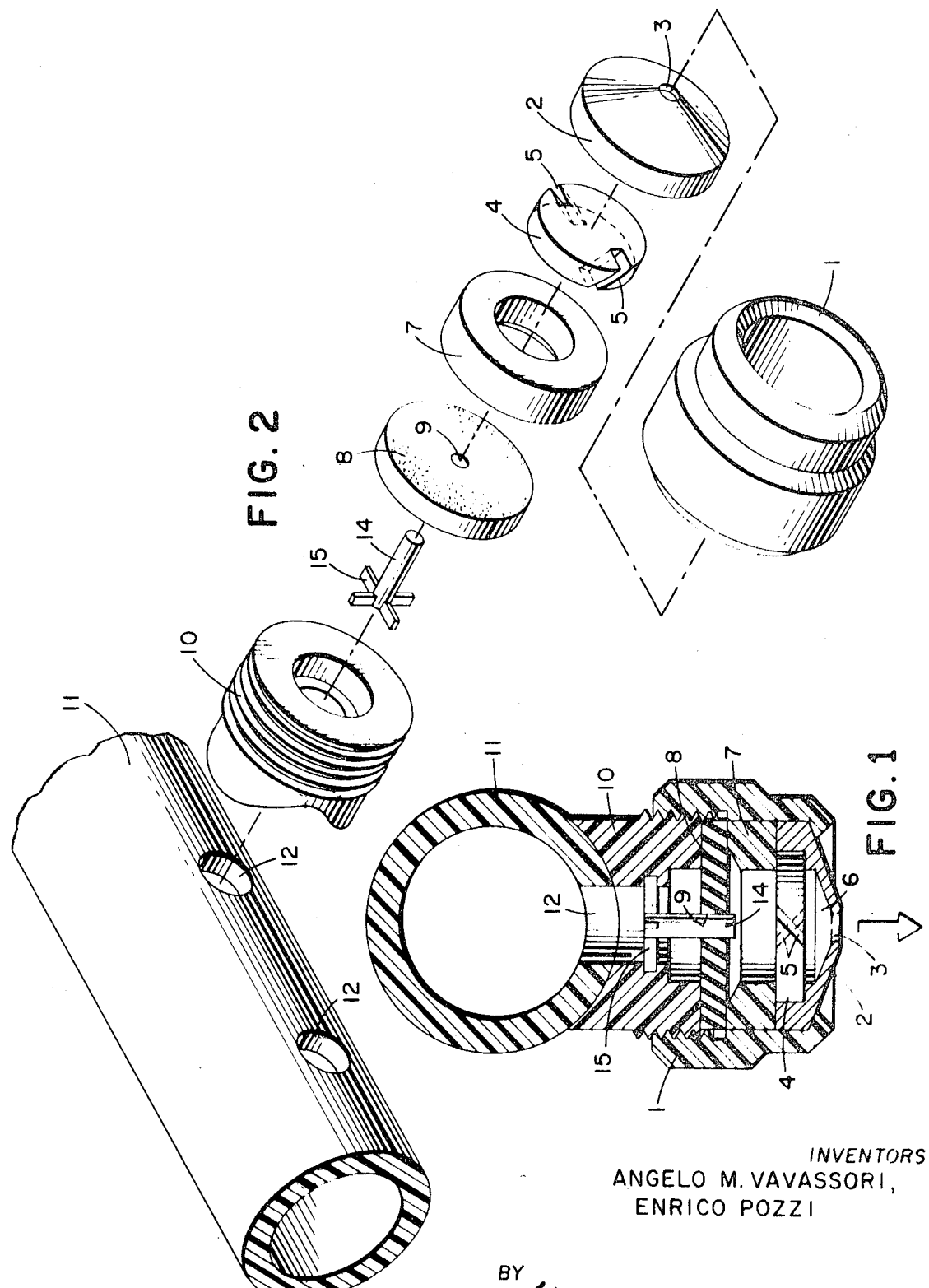

3,623,660

DRIPPROOF VALVE FOR PREVENTING THE LEAKAGE OF LIQUID PRODUCTS

The present invention relates to an improvement to the dripproof valve for preventing the leakage of liquids when the liquid stream under pressure is cut off, as described in our copending application Ser. No. 811,388, now abandoned filed on Mar. 28, 1969.

Though this valve can be used in numerous environments wherever a good sealing is required to prevent any leakage of liquid when the pressured supply of the liquid is cut off—such as feed and drain pipes of industrial plants, tank truck feed hoses, and so forth—this invention will be hereinafter described in connection with its particular application to the nozzles for spray-treating soils and crops without, however, the invention being limited to this particular application.

The invention also covers the improved nozzle with the retaining valve hereinafter described, which nozzle is particularly suitable for spray treatments with liquids, and in particular for the treatment of agriculture soils and crops by either water or formulations, such as aqueous suspensions or emulsions, to be used as pesticides, fungicides, herbicides, insecticides, and so forth.

The nozzle further improved according to the present invention avoids the dripping of the treatment liquid when the pressured supply of said liquid is cut off during the spray operation carried out by aircraft or ground vehicles, and in such combination such a nozzle proves to be especially useful.

In connection with the treatment of soils and crops, the liquid product is sprayed under pressure on the soil surface to be treated. Agricultural soil or crop spraying is generally not made by a single nozzle but rather by a set of nozzles mounted on a special boom, or header, which in turn is installed on either an aircraft or a ground vehicle so as to allow a uniform spraying of a stretch of land.

The nozzle type generally used consists essentially of a chamber into which the liquid product flows at a pressure normally ranging from 1 to 5 atm., according to the results to be attained, the liquid having a rotation imparted thereto by the feed holes inclined in respect to the nozzle axis; from this chamber the liquid product in whirling motion is forced through the nozzle discharge hole where it is separated into droplets of different sizes according to the delivery pressure and the diameter of the nozzle hole.

The type of nozzle generally used presents a considerable disadvantage in that by cutting off the pressured liquid supply—usually obtained by means of a pump—the spraying of the liquid through the nozzle is interrupted but dripping occurs caused by the liquid remaining downstream of the pump or cutoff valve, i.e. the residual liquid contained in the section of pipe between the pump or cutoff valve and the boom, or header, on which the spray nozzles are mounted.

This dripping is not only a nuisance but, furthermore, may involve serious consequences, especially when liquids are used which are of a kind that are potentially dangerous whenever unatomized, e.g. toxic herbicides or pesticides that can, by dripping, cause damage to crops or even to people or animals, particularly when the spraying of the soil is from the air.

To avoid this trouble various solutions have been suggested which, however, have proved to give poor practical results owing to various drawbacks and obstacles which make their realization and practical application difficult.

To give an example, in U.S. Pat. No. 2,639,194 a system is described for avoiding the dripping of the pressure treatment liquid upon cutting off the supply of the same. This is brought about by preventing the residual liquid from flowing out, by means of a rubber diaphragm or membrane loaded by a spiral spring placed in the nozzle; when the liquid is forced forward by the pump it presses on the membrane which bends, opposing against the spiral spring, and thus allowing the liquid under pressure to flow out and to be sprayed through the nozzle hole. When the flow under pressure is cut off, the spiral spring presses on the membrane—this being no longer displaced by the liquid pressure flow—so as to close the nozzle hole again; this prevents the residual liquid upstream of the membrane (i.e. the liquid remaining both within the boom or header and within the pipes connecting the boom to the delivery pump) from flowing out freely.

U.S. Pat. No. 2,639,194 does not solve the above-mentioned technical problem, as the spring device operating the membrane (owing to overworking of the nozzle and also particularly during its idling periods) becomes easily spoilt or out of order thus losing its efficiency.

This occurs particularly when the liquid to be sprayed is a suspension that may cause deposits or incrustations in the nozzle, as is commonly the case of treatments with fungicides in which the spray liquid is often an aqueous suspension containing wettable powders; in this case even very small incrustations may prevent the regular working of both the membrane and the spring, and consequently the membrane is no longer tight and efficient enough to prevent dripping. Furthermore, the device just described has proven to be too complicated, requiring repeated periodic overhauling which entails practical and financial disadvantages.

An object of the present invention therefore is to provide a nozzle for the spraying of liquids, and particularly for agricultural soil and crop spraying, to prevent leakage of the liquid when the pressured liquid supply is cut off thus avoiding the drawbacks and disadvantages mentioned above. A further object of this invention is to provide an antileakage nozzle that is simple and easy to manufacture and to assemble, with considerable practical and financial advantages.

An antileakage valve adapted to provide the above specified advantages has already been described in our copending application Serial No. 811,388, said valve being made of a membrane having at least one notch or slot with elastically deformable lips, which allows the liquid to flow only when the latter is under pressure.

It has now been discovered that the same results may be attained if the previously cited notch or slot in the membrane is replaced by a hole or opening having an elastically deformable lip slidingly coupled with a pin passing through said opening. The shape and cross section of said pin must substantially correspond to the corresponding ones of the membrane opening.

The invention will now be described in greater detail with reference to the accompanying drawings provided for the purpose of illustrating the invention still more clearly, and in which:

FIG. 1 schematically shows a cross section of nozzle according to the present invention fixed at the header that supplies the treatment liquid under pressure; and FIG. 2 schematically shows an exploded view of the various parts forming the nozzle.

With reference to the foregoing figures, the antileakage nozzle of the present invention consists of a threaded ring 1 preferably made of a plastic material such as, e.g., PVC, which forms the nozzle holding cap; a cone-shaped spray nozzle 2 preferably made of stainless steel, provided with a hole 3 through which the liquid is sprayed. The spray hole diameter varies according to the kind of liquid flowing therethrough and the type of treatment; the diameter of the hole preferably varies from 1 to 2.5 mm. according to requirements.

A metal plate 4, preferably made of steel or brass, is provided having inclined side canals or channels 5 for allowing the liquid to flow through while subdividing and setting it into a whirling motion inside chamber 6 of the spray nozzle 2 before the stream escapes through hole 3. A suitable spacer 7, preferably of plastic, is provided adjacent the metal plate 4.

An antileakage membrane 8 made of an elastic material, preferably natural rubber or an elastomeric synthetic material, is also provided. This membrane 8 is provided with a centrally placed circular opening or hole 9 with lips.

A nozzle-holding support 10, preferably made of a plastic material, has attached therein a circular pin 14 fastened within by known means, e.g. a spoke-shaped piece 15, said pin being adapted to pass through the circular hole 9 centrally located on membrane 8 of the fully assembled unit. The cross section of the circular pin 14 is the same as that of the hole 9.

Only a portion of the boom or header 11 is shown. This is made preferably of plastic material. On it two or more spray nozzles are attached in parallel arrangement.

The assembling of the nozzle is easily made by setting parts 1, 2, 4, 7 and 8 together, as clearly shown in FIG. 1, and then screwing the nozzle-holding cap 1—together with parts 2, 4, 7 and 8 housed therein—onto the support 10 which is in turn connected (by fitting or other known systems) to header 11 at a point corresponding to one of the holes 12. This screwing operation causes the pin 14 to fit into the hole 9 of the membrane 8.

The way in which the antileakage nozzle of the present invention works is as follows: with the liquid pump functioning, upon opening the supply circuit the liquid upstream of membrane 8 (i.e. the liquid contained (a) in the pipes that connect the feeding pump with header 11, (b) in the header 11, and (c) in the support 10 presses against the membrane 8 causing the lip of the hole 9 to open, thus allowing the flow of the liquid to pass, along pin 14, into the chamber 13. From the chamber 13 the liquid is forced through canals 5 of the jet fractioning plate 4, into the cone-shaped chamber 6 of the nozzle where the stream acquires a whirling motion before flowing out from the spray hole 3, from which it is ejected in the form of atomized droplets kept in a conic projection in the general direction of the arrow (FIG. 1).

When the liquid supply circuit is closed, which results either by stopping the liquid feed pump or by means of a cutoff valve or similar devices, the pressure exerted against membrane 8 by the liquid upstream of the membrane also ceases, the lips of hole 9 revert to their original closing position and closely adhere to pin 14. In this way, not only does the spray of liquid through the hole 3 cease but also any dropping of the residual liquid upstream of the membrane through this hole 3 is prevented.

Membrane 8 can be made of any suitable material provided the lip of the hole 9 is elastic enough to bend, thus allowing passage of liquid along pin 14 when pressure develops on it owing to the liquid flow, and to close, going back to its original position, when the liquid pressure ceases. Membrane 8 can therefore be entirely made of elastic material such as e.g. natural or synthetic rubber, or any other elastomeric synthetic material; or else it may consist of a rigid material with an elastically deformable part corresponding to the lip or border of the hole 9. Furthermore the lip can be provided with stiffening ribs to make reclosing of the hole, upon interruption of the liquid flow pressure, more certain and more efficient. The shape of the hole 9, and consequently the cross section of the pin 14, can vary, e.g., either circular or oval or of any other suitable shape. Furthermore, pin 14 instead of being fastened in support 10 can be secured to spacer 7.

The thickness and strength of the membrane must be of course be sufficient to withstand the pressure of the liquid flow without breaking.

According to an important variation of this invention which finds particular application in devices such as nozzles or pipes where a backflow of the liquid must be prevented, the membrane 8 is coupled (on the side receiving the flow of the liquid which is to be let through, e.g. on the side of the nozzle-holding support 10 as shown in FIG. 2) with a rigid disc, e.g. a metal one, provided with an opening corresponding with hole 9.

In this way the lip of hole 9 only opens when the liquid flow pressure develops at the side of the rigid disc, while when the liquid flow pressure develops on the membrane in the opposite direction, owing to the fact that the membrane cannot deform because it is backed by the rigid disc underneath, as a result, it cannot make the hole 9 lip open and thus consequently it stops the flow of liquid.

With such a variation the antileakage valve of the present invention can also find a useful and practical application as a backflow valve in various installations.

The above description illustrates the advantages of the present invention and can be summarized as follows:
the valve is perfectly dripproof against any leakage of liquids when the liquid supply is cut off,
it is easy and simple to manufacture, having a low manufacturing cost, etc.

We claim:

1. A dripproof valve for preventing the leakage of liquids comprising a diaphragm or membrane provided with at least one opening or hole having an elastically deformable lip or border, slidably coupled with a pin passing through said hole, said valve coacting with and being an integral part of a nozzle for the spraying of liquids, which nozzle is suited for soil or crop spraying, said membrane being disposed between a nozzle-holding support and a spacer which separates the membrane from a jet fractioning or separating plate provided with flow-through channels which is placed within the spray nozzle, all said parts being housed within a threaded ring which in turn is attached to the nozzle-holding support in which is fixed said pin slidingly disposed with respect to the hole of said membrane.

* * * * *